June 4, 1957  A. G. SCHILBERG  2,794,632
VEHICLE WHEEL SUSPENSION

Filed Oct. 22, 1954  2 Sheets-Sheet 1

INVENTOR.
Arnold G. Schilberg
BY
ATTORNEYS.

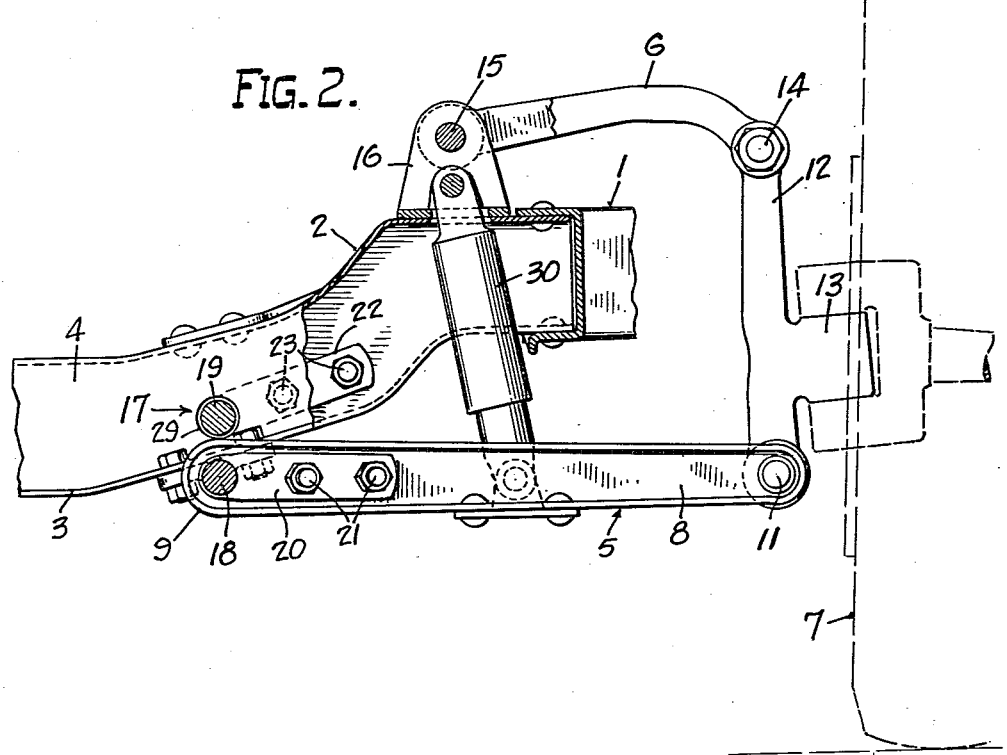
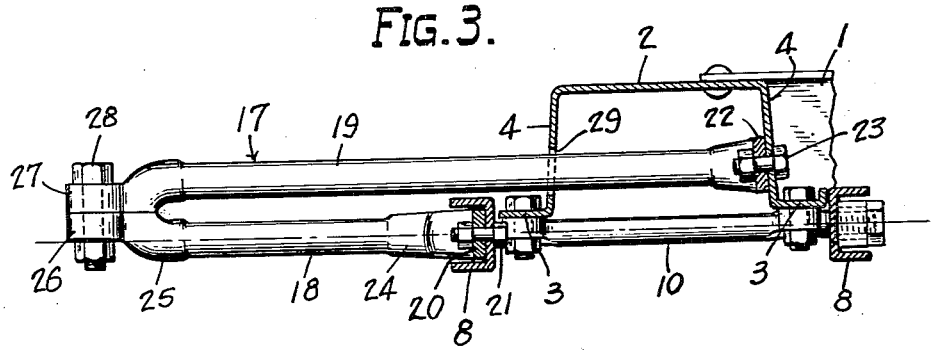

United States Patent Office 2,794,632
Patented June 4, 1957

2,794,632

VEHICLE WHEEL SUSPENSION

Arnold G. Schilberg, Milwaukee, Wis., assignor to A. O. Smith Corporation, Milwaukee, Wis., a corporation of New York Application October 22, 1954, Serial No. 464,003

3 Claims. (Cl. 267—57)

This invention relates to a vehicle wheel suspension and particularly to a suspension employing a torsion spring.

Current trends in vehicle wheel suspension have favored the use of coil springs for the front wheels. The springs are usually disposed between a pan on the wheel control arm and the frame. Generally, a special pan must be provided to properly seat the spring. The closer to the wheel the coil spring is placed, the more efficiently it will operate. To attain best efficiency in the operation of coil springs, designers have offset the frame side bars toward the wheels a substantial distance to house the springs. This entails expensive machining operations and weakens the side bar members.

An object of this invention generally is to overcome the various problems encountered in a front wheel coil spring suspension. However, the apparatus of the invention is equally adaptable to a rear wheel suspension.

According to the invention a reverse bend torsion spring or a spring doubled-over on itself, having one end attached to a wheel control arm and the other end affixed to a frame element, is used in a wheel suspension for a vehicle to cushion the control arm oscillations in service. While it is preferred that the spring assume a generally planar U-shape, the term "doubled-over" is not intended to be so limited, but rather to include deviations from a generally planar U-shape as dictated by the chassis structure of the vehicle.

More specifically according to the invention, a pair of substantially straight torsion bars are utilized to form a reverse bend torsion spring for employment in a vehicle wheel suspension. Under an embodiment illustrative of the invention, one end of each bar is provided with a flange to complement a similar flange on the other bar whereby the substantially straight torsion bars are joined together to form the reverse bend torsion spring. The ends of the torsion spring opposite from the reverse bend are provided with flanges for attachment to the wheel suspension elements. One bar of the torsion spring is disposed substantially on the line of the center of oscillation of the wheel control arm and has its flanged end secured to the control arm for oscillation therewith. The second bar of the torsion spring is disposed as nearly parallel to the first bar as chassis construction permits and has its flanged end secured to a frame member of the vehicle. The reverse bend torsion spring serves to cushion the control arm oscillations in service and reacts primarily in torsion or twist with a minimum of bending.

The drawings furnished herewith illustrate the best mode of carrying out the invention as presently contemplated and set forth hereinafter.

In the drawings:

Fig. 2 is a view taken on line 2—2 of Figure 1; and

Fig. 3 is a view taken on line 3—3 of Figure 1.

Figure 1:
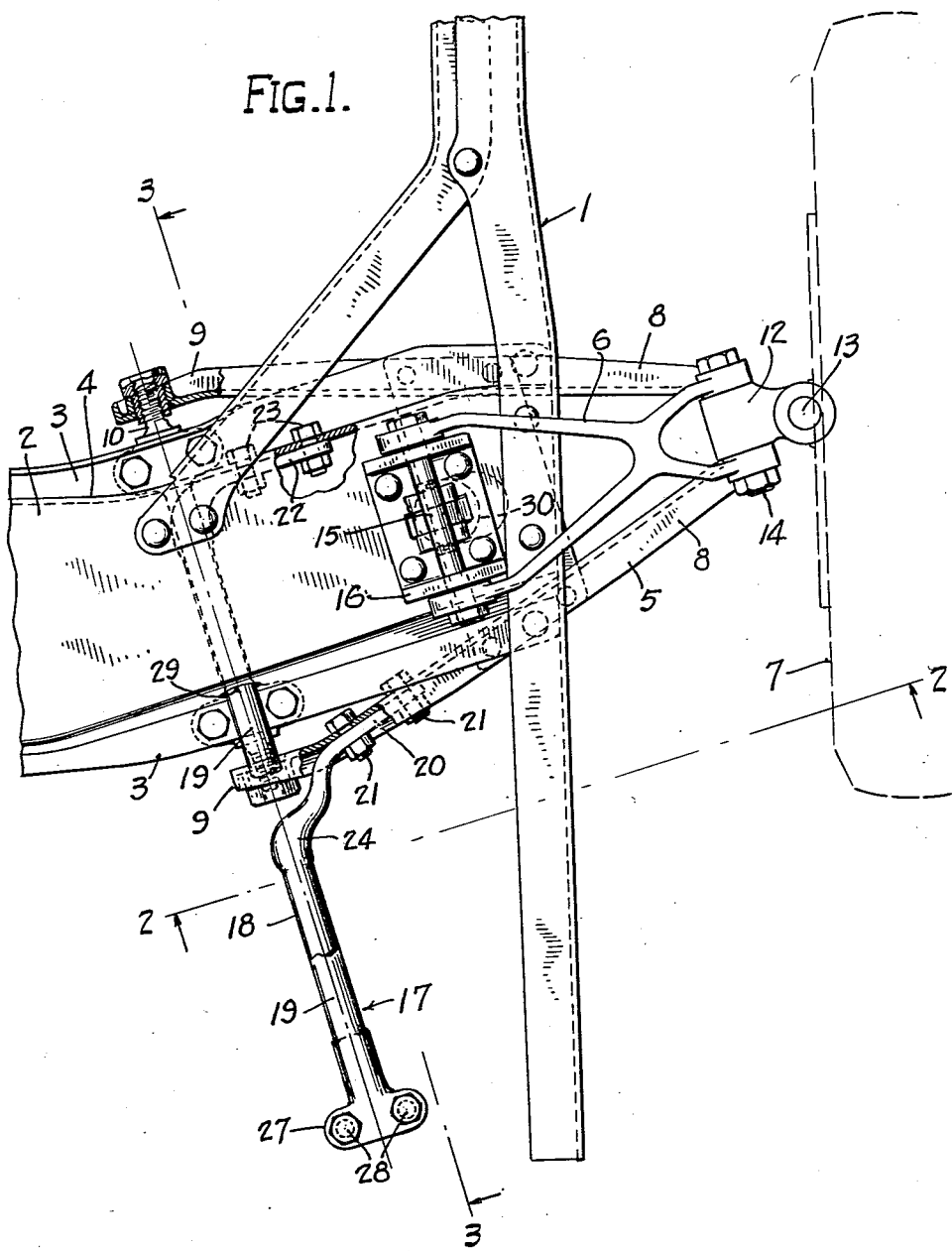
Figure 1 is a top plan view of the invention with parts broken away.

In carrying out the invention the forward portion of a side member frame element 1 of a vehicle is shown in the drawings. The side member frame element 1 receives the outer end of cross member frame element 2 and is secured to element 2.

The cross member frame element 2 has a generally channel-shaped cross-section with flanges 3 extending outwardly from the side walls 4 of the section and is joined to the side member 1 by suitable rivets or the like.

The suspension assembly is comprised of a lower control arm 5 and an upper control arm 6 which suspend the wheel 7 from the frame of the vehicle at the position of cross member 2 as will be described.

The lower control arm 5 is formed of a pair of channel-shaped arms 8 that are disposed with respect to each other to form an arm of generally triangular or wishbone appearance. The webs of the arms 8 face each other and at their inner ends 9 are embossed and internally threaded for threading engagement with the ends of the shaft 10 which is bolted or otherwise secured to the flanges 3 of cross member 2 slightly inwardly from side bar 1. In service the arms 8 turn on the threaded ends of shaft 10 as the control arm oscillates about the shaft with respect to the frame.

The outer or converging ends of arms 8 are pivotally secured to the opposite ends of shaft 11 which extends transversely through the lower end of the vertically extending steering knuckle support 12. Support 12, immediately above shaft 11 and the lower control arm, is provided with the steering knuckle 13 from which wheel 7 is suspended.

The upper control arm 6 is also of wishbone shape but is substantially smaller than lower arm 5. The outer end of control arm 6 is pivotally secured to the opposite ends of a shaft 14 which extends through the upper end of knuckle support 12 parallel to lower shaft 11 on which arm 5 is pivoted.

The inner ends of upper control arm 6 are pivotally secured to the opposite ends of a shaft 15 which is supported in a gearing bracket 16 secured to the top of cross member 2. The longitudinal center line of control arm 6 is parallel to and vertically above the center line of the lower control arm 5.

The wheel suspension of this invention includes a reverse bend or double-over torsion spring 17. Spring 17 in general is comprised of a lower bar 18 and an upper bar 19 which are joined together at their respective reverse bend ends to form a generally U-shaped member. The inner end 20 of bar 18 opposite from the joined or outer end is flanged and extends parallel to arm 8 of control arm 5. The flanged end 20 is secured to control arm 5 as by bolts 21. The inner end 22 of bar 19 opposite from the joined or outer end is flanged and extends parallel to web 4 of frame element 2. The flanged end 22 is secured to web 4 by bolts 23.

The bar 18 is disposed substantially in line with shaft 10 of the lower control arm 5. The central portion of bar 18 is of uniform cross-section and the elbow 24 of the bar adjacent the control arm 5 is enlarged with the bar being deformed as it approaches flanged end 20 lying parallel to arm 8 of the lower control arm in order to clear the attachment of arm 8 to shaft 10. The inner end portion 20 which is bolted to arm 8 is of lesser cross section in its extent parallel to arm 8 to fit within the channeled arm 8.

The outer end of bar 18 is provided with an enlarged portion 25 which terminates in a coupling portion 26 having a flat upper and lower surface.

The bar 19 of spring 17 is disposed substantially parallel to and vertically above bar 18. The outer end portion is enlarged and provided with a coupling portion 27 formed complementary to coupling 26. Couplings 26 and 27 are secured together as by bolts 28.

The bar 19 extends from coupling 27 through an opening 29 provided in the near side wall 4 of the cross member frame element 2 and is bent at an angle in order to extend parallel with the inside surface of the opposite side wall 4 of frame element 2 for bolting thereto by bolts 23. At the bend of the bar 19 the bar is enlarged but the inner end portion 22 extending parallel with web 4 is of lesser cross section.

The cross-sectional area over the length of bars 18 and 19 is established in accordance with the stresses imposed at a given area of the spring and the stiffness desired in the spring. The uniform central portions of bars 18 and 19, respectively, are subject to a substantial torsion or twisting reaction in service. The end portions of the bars are enlarged to accommodate bending stresses in addition to the twisting or torsional stresses.

A shock absorber 30 is disposed between the control armm 5 and the frame to further lessen the shocks due to unevenness of the riding surface.

In service the control arms 5 and 6 oscillate together about their respective centers of oscillation as the wheel to which they are connected travels over an uneven surface. The reverse bend or doubled-over torsion spring 17 cushions the effect of these oscillations by a combination of twisting and bending in view of the attachment of the inner end of the spring to the cross bar 2 and the control arm.

Where chassis construction does not permit alignment between bar 18 and the center of oscillation of the lower control arm 5, and the spring must deviate somewhat from a generally planar U-shaped structure, bending as well as twisting may take place over the full length of one or both of the bars 18 and 19. The cross-sectional area may be varied in accordance with the additional bending stresses imposed.

While the reverse bend or doubled-over torsion spring has been shown and described in connection with a front wheel suspension, the same is readily adaptable to a rear wheel suspension wherein some form of control arm is utilized.

The wheel suspension of this invention provides an effective mode of cushioning a vehicle in service. The reverse bend torsion spring herein described may be used with current frame designs. However, it does not require the large off-sets in side member frames as are currently needed to house coil springs. Such a spring requires no special support elements since it may be attached directly to the chassis members currently employed. The invention further provides a simple method of fabricating the spring in two flanged parts for easy assembly to the chassis members.

Various modes of carrying out the invention are contemplated as within the scope of the following claims particularly pointing out and distinctly claiming the subject matter which is regarded as the invention.

I claim:

1. A wheel suspension mechanism for a vehicle frame, comprising control arm means pivotally mounted on the frame and connecting the frame and a wheel, a torsion member having one end secured to the control arm means and extending laterally therefrom in substantial alignment with the center of oscillation of the control arm means, and a second torsion member disposed substantially parallel to the first torsion member and having one end thereof secured to the frame, the remote ends of said torsion members being provided with complementary flanges and rigidly joined together to form a substantially U-shaped torsion spring to cushion the control arm means oscillations in service by a combination of twisting and bending.

2. In a vehicle chassis, a frame, a bearing shaft secured to the frame, a control arm pivotally mounted on the shaft for oscillatory motion in service, a torsion bar having enlarged end portions connected to the control arm and extending laterally therefrom in substantial alignment with the bearing shaft, and a second torsion bar having enlarged end portions disposed substantially parallel to the first named bar and having one end thereof secured to the frame, the remote ends of the torsion bars being provided with complementary flanges and rigidly joined together to form a substantially U-shaped torsion spring to cushion the control arm oscillations by a twisting action over the length of each bar and a combination of bending and twisting in the enlarged end portions thereof.

3. In a vehicle chassis, a frame element, a bearing shaft secured to the frame element, a control arm pivotally mounted on the shaft for oscillatory motion in service, a torsion bar having a central portion of uniform cross-section and enlarged end portions with one end portion being provided with a flange disposed angularly to the bar, means securing the flange to the control arm with the torsion bar extending laterally from the control arm in substantial alignment with the bearing shaft, a second torsion bar disposed substantially parallel to the first named torsion bar and having a central portion of uniform cross-section and enlarged end portions with one end portion being provided with a flange by which the second torsion bar is secured to the frame element, the remote end portions of said torsion bars being complementarily flanged and joined together to form a substantially U-shaped torsion spring to cushion the control arm oscillations by a twisting action throughout the uniform cross-section central portions of said bars and a combination of bending and twisting action in the enlarged end portions thereof.

References Cited in the file of this patent

UNITED STATES PATENTS

| 397,366 | Jarrell | Feb. 5, 1889 |
| 2,167,984 | Leighton | Aug. 1, 1939 |
| 2,561,548 | Wharam et al. | July 24, 1946 |

FOREIGN PATENTS

| 95,482 | Sweden | Feb. 16, 1939 |
| 186,380 | Great Britain | Sept. 25, 1922 |